(12) United States Patent
Chen et al.

(10) Patent No.: US 10,409,577 B2
(45) Date of Patent: Sep. 10, 2019

(54) HYBRID APPLICATION DELIVERY THAT COMBINES DOWNLOAD AND REMOTE ACCESS

(71) Applicant: VMware, Inc., Palo Alto, CA (US)

(72) Inventors: Ming Chen, Beijing (CN); Wei Tian, Beijing (CN); Bin Guo, Beijing (CN)

(73) Assignee: VMware, Inc., Palo Alto, CA (US)

( * ) Notice: Subject to any disclaimer, the term of this patent is extended or adjusted under 35 U.S.C. 154(b) by 60 days.

(21) Appl. No.: 15/615,968

(22) Filed: Jun. 7, 2017

(65) Prior Publication Data
US 2018/0357057 A1 Dec. 13, 2018

(51) Int. Cl.
| | | |
|---|---|---|
| G06F 8/61 | (2018.01) | |
| G06F 8/65 | (2018.01) | |
| G06F 9/455 | (2018.01) | |
| H04L 29/08 | (2006.01) | |

(52) U.S. Cl.
CPC .................. *G06F 8/61* (2013.01); *G06F 8/65* (2013.01); *G06F 9/45558* (2013.01); *H04L 67/1095* (2013.01); *H04L 67/148* (2013.01); *H04L 67/34* (2013.01); *G06F 2009/4557* (2013.01)

(58) Field of Classification Search
CPC ..................................... G06F 8/61; G06F 8/65
USPC ........................................ 717/178, 174, 173
See application file for complete search history.

(56) References Cited

U.S. PATENT DOCUMENTS

| | | | | |
|---|---|---|---|---|
| 9,225,799 | B1 * | 12/2015 | Dong | G06F 3/14 |
| 9,300,720 | B1 * | 3/2016 | Qiu | G06F 9/45504 |
| 9,444,912 | B1 * | 9/2016 | Chen | H04L 69/08 |
| 2007/0033155 | A1 * | 2/2007 | Landsman | G06F 17/30899 |
| 2007/0033569 | A1 * | 2/2007 | Davidson | G06F 17/30902 717/103 |
| 2007/0033588 | A1 * | 2/2007 | Landsman | G06F 17/30899 717/178 |
| 2007/0060361 | A1 * | 3/2007 | Nguyen | G07F 17/32 463/42 |
| 2011/0276806 | A1 * | 11/2011 | Casper | G06F 21/602 713/189 |
| 2015/0271162 | A1 * | 9/2015 | Dulkin | H04L 63/08 726/7 |

* cited by examiner

*Primary Examiner* — Phillip H Nguyen

(57) ABSTRACT

Hybrid application delivery is described which utilizes both remote access and downloading of content over the network. When a user requests an application that is not locally available, a remoting session is first established to allow the user to begin using the application. While the user is accessing the remote session, a process is initiated to download the content of the application to the end user's device. This process may execute in the background while the user continues to use the application over the remote session. Once the process of downloading the content of the application is complete and the application is installed, a local session of the application is started and the user may switch to the local session. The system also synchronizes changes to user data made on the server during the remoting session with the end user's computing device.

17 Claims, 4 Drawing Sheets

HYBRID APPLICATION DELIVERY THAT COMBINES DOWNLOAD AND REMOTE ACCESS

TECHNICAL FIELD

The present disclosure generally relates to delivering applications to end user devices, and more specifically relates to delivering an application using a hybrid approach that combines remote network access and downloading.

BACKGROUND

A software application can be delivered to an end user's device in a number of different ways. One conventional technique is to download the files which comprise the application over a network and then execute an installer to make the application ready for execution on the destination device. This downloading and installation process may be quite lengthy especially if the application is large, however once the application is installed, it is locally available and provides quick access to any physical resources of the device. There have been some improvements to this traditional technique, which try to eliminate the need for a separate installation process. These approaches are sometimes referred to as application virtualization and they typically aim to encapsulate the contents of the application in such a way that the application is ready for execution immediately after being downloaded to the device. While these techniques reduce the overall time taken to begin using the application by removing the need for installation, they still require a waiting period while the contents of the application are being downloaded.

Another way to deliver an application to an end user is through remote access, also sometimes referred to as application remoting. This approach executes the application on a remote server and therefore does not require the downloading of the application's contents (files) to the end user's device. Using this technique, only the graphical user interface (GUI) information (i.e. pixel data) is streamed over the network from the server to the end user device and any user input captured on the device is transmitted to the server. Remoting technologies can be utilized to provide entire remote desktops, such as those based on Virtual Desktop Infrastructure (VDI) and Desktop-as-a-Service (DAAS). In a conventional VDI or DAAS environment, a user is provisioned a virtual desktop with multiple applications and the user is allowed to access their virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server which is linked to the local client device over network, using a remote display protocol such as remote desktop protocol (RDP), PC-over-IP (PCoIP) protocol, virtual network computing (VNC) protocol, or the like. Using such a remote desktop protocol, the user can interact with applications of the virtual desktop, which are running on the remote host server, such that only the display (i.e., image data), keyboard, and mouse information is communicated with the local client device. A common implementation of this approach is to host multiple desktop operating system instances on a server hardware platform running a hypervisor.

Both forms of application delivery (remote access and download) have their advantages and shortcomings. For example, downloading and installing the application on the end user's device provides good performance and allows the application to utilize the physical resources (e.g. local storage) of the device, however it requires a tedious and often lengthy process of waiting for the application to download and going through the installation process. Conversely, application remoting allows the user to start using the application immediately, however it requires a network connection and often offers reduced performance when compared to local execution, particularly when the network connection is not optimal.

DETAILED DESCRIPTION

Systems and methods in accordance with various embodiments of the present disclosure overcome at least some of the above-mentioned shortcomings and deficiencies by utilizing a hybrid approach for application delivery which includes both download and remote access. More particularly, when a user requests an application that is not locally available on the computing device, a remoting session is first established to allow the user to immediately begin using the application. While the user is accessing the application using the remote session, a process is also initiated to download the contents of the application (e.g. files, folders, registry entries, etc.) to the end user's device. This process may execute in the background transparently from the perspective of the user, while the user continues to use the application over the remote session. Once the process of downloading the content of the application is complete and the application is installed (or otherwise deployed on the computing device), a local session of the application can be started on the computing device and the user may be offered an option to switch from the remoting session to the local session of the application executed on the computing device. In alternative embodiments, the switch may be performed automatically without any input from the user, such as in cases where this default configuration is selected.

While the user is using the application over the remoting session, the user may make various changes to content on the server hosting the application. For example, the user may add or modify files on the server by using the application over the remoting session. In order to make sure that such changes are available to the user after the remoting session is switched to the local session of the application, the system may synchronize the changes (either periodically or at the end) between the server and the end user's computing device. For example, when the remoting session is started, an agent operating on the server may scan the listing of all files on the server and periodically re-scan the files to compute a delta that includes any changes made by the user during the remoting session. This delta can be synchronized with the computing device, such as by copying any new or modified files to the corresponding file paths on the computing device. This synchronization of the delta may be performed at the completion of the download process or, alternatively, the synchronization process may be periodically repeated during the download process until the local session of the application is ready.

Figure 1:
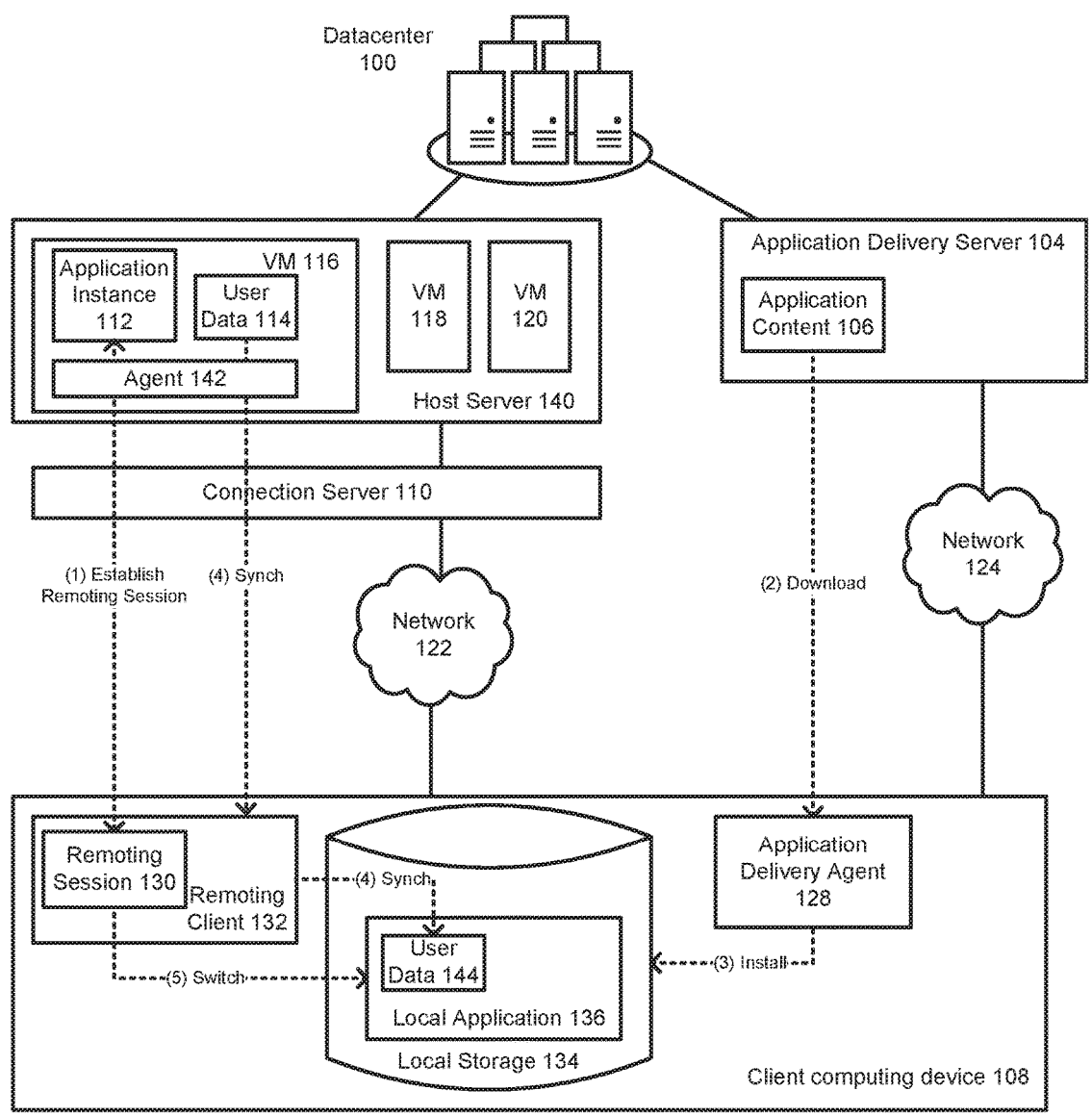
FIG. 1 illustrates an example of hybrid delivery of an application using both downloading and remote access, in accordance with various embodiments.
Figure 1:

FIG. 1 illustrates an example of hybrid delivery of an application using both downloading and remote access, in accordance with various embodiments. As illustrated in the figure, when a user 102 requests an application that is not locally installed on the client computing device 108, a remoting session 130 is first established with a remote instance of the application 112 executing on a remote host server 140 using a network connection 122. The remoting session 130 may be established between the remoting client 132 operating locally on the client computing device 108 and a server-side agent 142. The agent 142 operating on the server may transmit pixel data comprising the graphical user interface (GUI) of the application to the remoting client 132, while the remoting client 132 can display the received pixel data to render the local interface of the application, as well as capture any user input and transmit the user input back to the agent 142. In some embodiments, such as in a virtual desktop infrastructure (VDI) based embodiments, the host server 140 may execute a number of virtual machines (116, 118, 120) and the application instance 112 may be deployed on one of those virtual machines, such as virtual machine 116. In these embodiments, each virtual machine may be used to provide a virtual desktop with multiple applications available to be accessed over a remoting session. A connection server 110 may also be implemented to manage the connections between the remoting client 132 and the VM 116 hosting the application instance 112 to be accessed. In such VDI based environments, the host server 140 typically resides in a data center 100 that houses many servers, storage arrays, network switches and other devices which have not been shown in this figure for simplicity. Virtual desktop environments are described in further detail with reference to FIG. 2 of this specification.

Once the remoting session 130 has been established by the remoting client 132, a process is also started to download the application content 106 from an application delivery server 104 so that the application can be locally installed on the client computing device 108. For example, once the remoting session 130 has been established and the user is using the remote instance of the application, the application delivery agent 128 may start downloading the files that comprise a local installation of the application 136 over a network connection 124 and storing those files in local storage 134 of the computing device 108. The network connection 124 may be the same type of network connection as network connection 122 or may be a different type of network connection. In some embodiments, a network connection may be a wide area network (WAN) connection such as an Internet connection, while in other embodiments, it may be a local area network (LAN) connection. Similarly, while the application delivery server 104 is illustrated as being housed in the same data center 100 as the host server 140 in FIG. 1, in alternative embodiments, these servers may physically reside in different locations.

Once the downloading of all the application files has completed, the application delivery agent 128 may start the installer to perform the local installation of the application. Alternatively, the application may be deployed and made ready for execution on the local computing device 108 without going through the conventional installation process, such as by utilizing application virtualization or application encapsulation techniques, as will be described later in this disclosure. For example, in some embodiments, rather than performing an installation process, the application delivery agent 128 may download a virtual disk, such as a virtual machine disk (VMDK) or a virtual hard disk (VHD), containing the application files and registry entries and mount the virtual disk on the local computing device to make the application ready for execution.

While the user 102 is accessing the remote instance of the application 112 over the remoting session 130, he or she may make changes to user data 114, such as creating, deleting or modifying files on the host server 140. In various embodiments, it is useful to synchronize those changes between the remote host server 140 and the local application 136 on the client computing device 108 so that the user has access to the work they performed while in the remoting session 130. To synchronize these changes, an agent 142 operating on the VM 116 may monitor one or more folders and/or directories for any changes that the user may make on the server 140 and replicate those changes to the local storage 134 of the client computing device 108. In one embodiment, before the user begins using the application instance 112 over the remoting session 130, the agent may reserve a list of all current files in one or more designated folders/directories that are conventionally used to store changes to user data 114. For example, the agent 142 may monitor the installation path and the system temp folder, as these two locations are conventionally used to store changes to user data. When the user begins using the application, the agent may periodically obtain a current listing of files in those directories and calculate a delta containing any new or modified files based on the differences between the original list and the current list. In an alternative embodiment, a snapshot mechanism can be utilized to capture all changes on the virtual machine 116, such as by capturing a snapshot of the VM before the user begins using the application instance 112, and then periodically capturing delta snapshots which contain only the changes since the first snapshot.

If only file changes are monitored by the agent, any user changes made in memory but not yet committed to persistent storage may be lost during the transition from the remoting session to the local session of the application. In some embodiments, this may be acceptable since the user may be asked to save the file before switching to the local session of the application. In alternative embodiments, however, the memory changes may also be transferred from the virtual desktop to the local application session. For example, changes in application state such as text entered by the user before saving the file, location of the cursor or other application state may also be captured by the agent and transferred to the local application to be synchronized therewith.

Once the delta containing the modified files has been calculated, it can be transmitted by the agent 142 to the remoting client 132 and the files can be copied to their respective location in local storage 134 of the client computing device 108. For example, if a new file has been created by the user in the installation path on the host server 140, the file can be copied to the identical location on the local storage 134 on the client computing device 108. In this manner, the user data 114 on the host server 140 is synchronized to replicate the user data 144 on the client computing device 108. Similarly, application state information in memory may also be synchronized with the client computing device 108, as previously discussed. In some embodiments, the user data 114 can be synchronized on a periodic and ongoing basis (e.g. every several seconds) while the user is using the application over the remoting session 130. Alternatively, the user data may be synchronized when the local installation of the application 136 has been completed and the user is ready to switch to the local version of the application. Yet in other embodiments, the user data 114 may be synchronized each time that a change is made to the monitored location on the host server 140. Regardless of the implementation of synchronizing the changes, when the user is ready to switch to the local application, any changes that were made during the remoting session 130 would be available in local storage 134 of the client computing device 108.

Once the local application has been installed or otherwise made ready for execution, a local instance of the application 136 can be launched. In one embodiment, a message may be displayed to the user indicating that a local version of the application is now available and that the user may switch to the local version. When the user enters input indicating a wish to switch, the local application 136 is started and the remote session 130 is terminated. From that point on, the user may continue using the local version of the application, with any changes to user data available locally, as previously mentioned. In alternative embodiments, the switch may occur automatically and it may even be made transparent from the perspective of the user so as to make the experience more seamless. For example, the remoting session 130 may be closed and a local window opened having the local session of the application 136 running on the client computing device 108.

As previously mentioned, a local copy of the application can be delivered to the client computing device 108 by downloading an application storage volume (e.g. virtual disk) containing the application files and attaching it on the local storage 134 of the client computing device 108 rather than going through a traditional installation process. In one embodiment, the application storage volume can be attached by mounting the virtual hard disk containing the application to the computing system and modifying the registry keys, file paths and other information to make the application appear as though it has been locally installed. Alternatively, the act of attaching the application volume may involve mapping or otherwise making available the application volume to the computing system. For example, the volume containing the application may be mapped and registry settings changed to direct future calls of that file type to the application stored in the virtual hard disk.

Mounting an application storage volume may be accomplished by associating the name of the volume with an access path to the volume. Once mounted, the application files, directories, and other application elements may be overlaid within the file system of the endpoint device in order to provide the user with access to the application without going through the traditional installation process. Overlaying may be accomplished by editing the file system to redirect requests to the components on the newly-mounted volume (e.g., virtual disk), rather than pointing to their local counterpart components that were previously installed in the original installation locations and subsequently removed.

In some embodiments, the application storage volume is a virtual disk, as available for example in the virtual machine hard disk (VMDK) format or the virtual hard disk (VHD) format. In alternative embodiments, the application storage volume may take a different form, such as hard disk partitions, flash memory portions, or other virtual or non-virtual storage locations. In some embodiments, the application storage volume can also be detached from the computing device, thereby disabling the application on the computing device. The process of detaching the application volume may include un-mounting the virtual disk from the computing device, or preventing the computing device from accessing the virtual disk and the corresponding components. If the original components of the application have not been deleted from the original locations, detaching may also include editing the file system of the computing device to redirect requests from locations in the virtual disk to the original locations in which the components reside.

Figure 2:
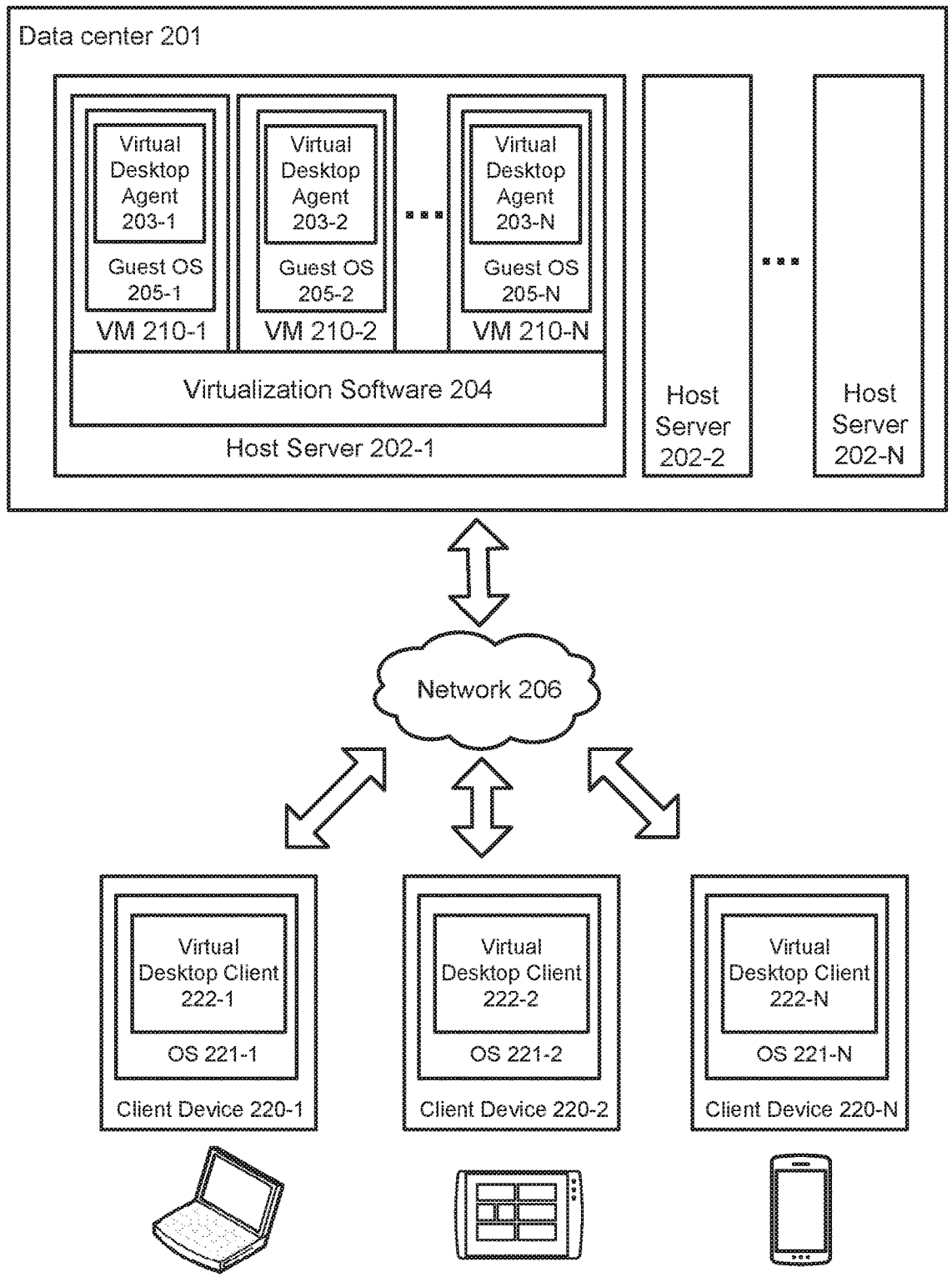
FIG. 2 illustrates an example of a virtual desktop environment which can be used to provide a remoting session, in accordance with various embodiments.

FIG. 2 illustrates an example of a virtual desktop environment which can be used to provide a remoting session, in accordance with various embodiments. As used throughout this disclosure, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device even though the desktop is actually executing remotely.

As illustrated in FIG. 2, the virtual desktop environment, such as VDI or DAAS environment, includes host servers (202-1, 202-2, 202-N) that are communicatively coupled with a number of client devices (220-1, 220-2, 220-N) via a network 206. Network 206 may be a wide area network (WAN), or other form of remote communication link between the host servers (202-1, 202-2, 202-N) and client devices (220-1, 220-2, 220-N). Network 206 may further include numerous other components, such as one or more firewalls, connection brokers, management servers, etc., which are not shown here so as not to obscure salient features of the remote desktop environment. Host servers (202-1, 202-2, 202-N) may physically reside in a data center 201 of the enterprise (e.g., in case of VDI) or in a data center of a third-party service provider (e.g., in case of DAAS).

By way of illustration, host server 202-1 can interoperate with client devices (220-1, 220-2, 220-N) to provide virtual desktop services to users of client devices (220-1, 220-2, 220-N). For example, host server 202-1 can host, for each user, a desktop that is presented by a guest operating system (such as one of the guest operating systems 205-1, 205-2, 205-N) running on a virtual machine (such as one of the virtual machines 210-1, 210-2, 210-N) on host server 202-1. In this context, the terms "desktop", "remote desktop", and "virtual desktop" refer to a computing environment in which a user can launch, interact with, and manage the user's applications, settings, and data. Each client device (220-1, 220-2, 220-N) can allow a user to view on a desktop graphical user interface (on a local display device) his/her desktop that is running remotely on host server 202-1, as well as provide commands for controlling the desktop. In this manner, the users of client devices (e.g., 220-1, 220-2, 220-N) can interact with the desktops hosted on host server 202-1 as if the desktops were executing locally on client devices (220-1, 220-2, 220-N).

In the embodiment of FIG. 2, host server 202-1 includes virtualization software 104 that supports the execution of one or more virtual machines (VMs) (e.g., 210-1, 210-2, 210-N). The virtualization software 204 may be a hypervisor, a virtual machine manager (VMM) or other software that allows multiple virtual machines to share the physical resources of the server. In the illustrated embodiment, each virtual machine (e.g., 210-1, 210-2, 210-N) can execute a guest operating system (e.g., 205-1, 205-2, 205-N) that hosts a desktop for a single user at a time. For example, if five users connect to host server 202-1 for the purpose of initiating remote desktop sessions, the host server 202-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 220-1, 220-2, 220-N) can execute a virtual desktop client (e.g., 222-1, 222-2, 222-N). For example, the virtual desktop client (e.g., 222-1, 222-2, 222-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 222-1, 222-2, 222-N) running in the OS (e.g., 221-1, 221-2, 221-N) on the client device (e.g., 220-1, 220-2, 220-N) which communicates with a server-side virtual desktop agent (e.g., 203-1, 203-2, 203-N) that is running on the guest OS inside the virtual machine (e.g., 210-1, 210-2, 210-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 2 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 2, as well as all other figures in this disclosure have been simplified for ease of understanding and are not intended to be exhaustive or limiting to the scope of the invention.

Figure 3:
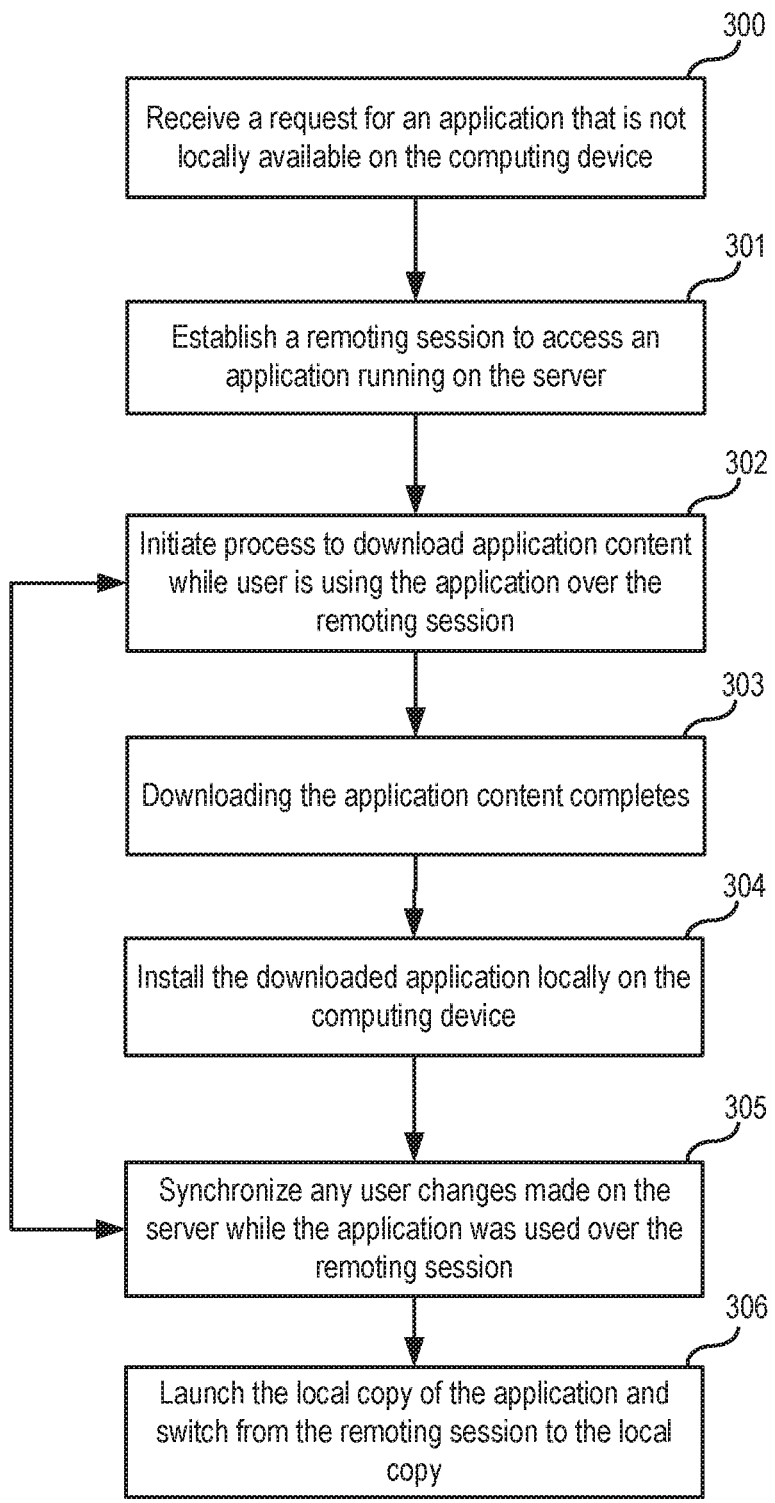
FIG. 3 illustrates an example of a process for providing hybrid application delivery that combines downloading and remote access, in accordance with various embodiments.

FIG. 3 illustrates an example of a process for providing hybrid application delivery that combines downloading and remote access, in accordance with various embodiments. As shown in operation 300, the process may begin when a user requests an application that is not locally available on the computing device. When such a request is received, the local computing device first establishes a remoting session to access a remote instance of the application running on the server, as shown in operation 301. The user then may begin using the remote instance of the application over the remoting session. While the user is using the application over the remoting session, the local device may initiate a process to download the content of the application, as shown in operation 302. The downloading of the application content can be performed in the background, while the user continues using the remoting session. When the downloading of the application content is complete (operation 303), the computing device may install the downloaded application locally, as shown in operation 304. Alternatively, the computing device may utilize another method for making the application locally available without going through the installation process, such as by attaching an application storage volume, as previously discussed.

While the user is using the remote application in the remoting session, any changes to user data may be synchronized between the host server and the local computing device, as shown in operation 305. It should be noted that although FIG. 3 illustrates this step as being performed at the end of the installation process, this is not necessary for all embodiments of the invention. For example, in alternative embodiments, the synchronization is performed periodically, while the application is being downloaded and the user is using the application via the remoting session.

Once the application has been installed and all of the user changes to user data have been synchronized, the local copy of the application is launched, as shown in operation 306. At this point, the remoting session can be terminated and the user may switch to the local session of the application running on the local computing device.

Figure 4:
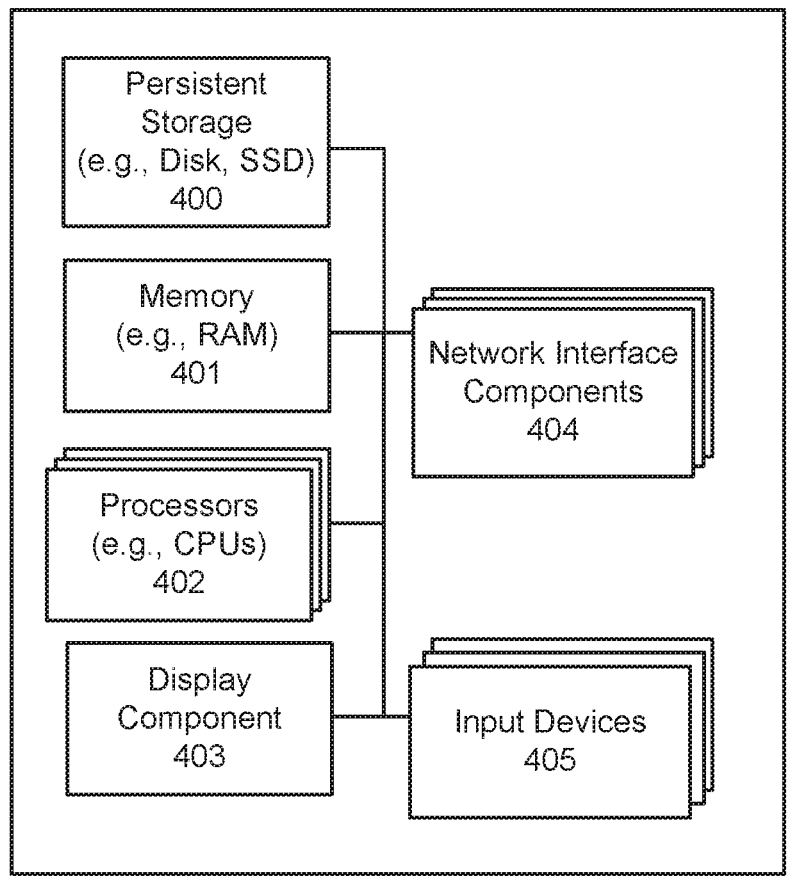
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for enabling application delivery to a computing device, the method comprising:
  receiving a request for an application that is not locally available on the computing device;
  establishing a remoting session for the computing device to access the application executing on a virtual machine hosted on a server over a network connection, wherein the remoting session includes transmitting framebuffer pixel data from the virtual machine to the computing device over the network connection and transmitting user input events from the computing device to the virtual machine over the network connection;
  while the application is being accessed using the remoting session, initiating a process to download a set of files that comprise the application to the computing device, the set of files operable to locally execute the application after being downloaded to the computing device;
  completing the download of the set of files while the application is being accessed using the remoting session;
  starting a local session of the application on the computing device by executing at least one of the set of files downloaded to the computing device; and
  switching from the remoting session to the local session of the application executed on the computing device.

2. The method of claim 1, wherein completing the download of the set of files further comprises:
   computing a delta that includes one or more changes to files made on the server while the application is accessed during the remoting session; and
   synchronizing the delta between the server and the computing device.

3. The method of claim 2, further comprising:
   periodically re-computing the delta while the process to download the set of files is executed; and
   synchronizing the delta after the process to download the set of files is completed.

4. The method of claim 1, wherein switching from the remoting session to the local session of the application executed on the computing device further comprises:
   displaying a notification that a local copy of the application is available on the computing device; and
   receiving user input indicating a request to switch from the remoting session to the local session of the application.

5. The method of claim 1, further comprising:
   executing an installer to install the application after the process of downloading the set of files to the computing device is complete.

6. The method of claim 1, wherein the process to download the set of files further comprises:
   downloading a virtual disk containing the set of files to the computing device; and
   attaching the application to the computing device by mounting the virtual disk on the computing device to make the application executable from the virtual disk.

7. The method of claim 1, wherein accessing the application using the remoting session further comprises:
   receiving, by the computing device, framebuffer data of a graphical user interface generated on the server and rendering the framebuffer data on the computing device; and
   transmitting user input data from the computing device to the server.

8. A computing device, comprising:
   at least one processor; and
   memory including instructions that, when executed by the at least one processor, cause the computing device to perform the steps of:
      receiving a request for an application that is not locally available on the computing device;
      establishing a remoting session for the computing device to access the application executing on a virtual machine hosted on a server over a network connection, wherein the remoting session includes transmitting framebuffer pixel data from the virtual machine to the computing device over the network connection and transmitting user input events from the computing device to the virtual machine over the network connection;
      while the application is being accessed using the remoting session, initiating a process to download a set of files that comprise the application to the computing device, the set of files operable to locally execute the application after being downloaded to the computing device;
      completing the download of the set of files while the application is being accessed using the remoting session;
      starting a local session of the application on the computing device by executing at least one of the set of files downloaded to the computing device; and
      switching from the remoting session to the local session of the application executed on the computing device.

9. The computing device of claim 8, wherein completing the download of the set of files further comprises:
   computing a delta that includes one or more changes to files made on the server while the application is accessed during the remoting session; and
   synchronizing the delta between the server and the computing device.

10. The computing device of claim 9, wherein the memory further comprises instructions that, when executed by the at least one processor, cause the computing device to perform the steps of:
    periodically re-computing the delta while the process to download the set of files is executed; and
    synchronizing the delta after the process to download the set of files is completed.

11. The computing device of claim 8, wherein switching from the remoting session to the local session of the application executed on the computing device further comprises:
    displaying a notification that a local copy of the application is available on the computing device; and
    receiving user input indicating a request to switch from the remoting session to the local session of the application.

12. The computing device of claim 8, wherein the memory further comprises instructions that, when executed by the at least one processor, cause the computing device to perform the steps of:
    executing an installer to install the application after the process of downloading the set of files to the computing device is complete.

13. The computing device of claim 8, wherein the process to download the set of files further comprises:
    downloading a virtual disk containing the set of files to the computing device; and
    attaching the application to the computing device by mounting the virtual disk on the computing device to make the application executable from the virtual disk.

14. The computing device of claim 8, wherein accessing the application using the remoting session further comprises:
    receiving, by the computing device, framebuffer data of a graphical user interface generated on the server and rendering the framebuffer data on the computing device; and
    transmitting user input data from the computing device to the server.

15. A non-transitory computer readable storage medium comprising a set of instructions, the instructions when executed by one or more processors causing the one or more processors to execute the operations of:
    receiving a request for an application that is not locally available on the computing device;
    establishing a remoting session for the computing device to access the application executing on a virtual machine hosted on a server over a network connection, wherein the remoting session includes transmitting framebuffer pixel data from the virtual machine to the computing device over the network connection and transmitting user input events from the computing device to the virtual machine over the network connection;
    while the application is being accessed using the remoting session, initiating a process to download a set of files that comprise the application to the computing device, the set of files operable to locally execute the application after being downloaded to the computing device;

completing the download of the set of files while the application is being accessed using the remoting session;

starting a local session of the application on the computing device by executing at least one of the set of files downloaded to the computing device; and switching from the remoting session to the local session of the application executed on the computing device.

16. The non-transitory computer readable storage medium of claim 15, wherein completing the download of the set of files further comprises: computing a delta that includes one or more changes to files made on the server while the application is accessed during the remoting session; and synchronizing the delta between the server and the computing device.

17. The non-transitory computer readable storage medium of claim 16, further comprising instructions that when executed by one or more processors, cause the one or more processors to execute the operations of:

periodically re-computing the delta while the process to download the set of files is executed; and synchronizing the delta after the process to download the set of files is completed.

\* \* \* \* \*